United States Patent [19]
Koide et al.

[11] Patent Number: 5,674,419
[45] Date of Patent: Oct. 7, 1997

[54] METHOD FOR WELD REPAIRING OF STRUCTURES IN NUCLEAR REACTORS

[75] Inventors: Hiroo Koide, Hitachioota; Yasumasa Tamai, Hitachi; Junichiro Morisawa, Naka-gun; Toshimi Matsumoto, Hitachinaka; Keiichi Uraki, Hitachi, all of Japan

[73] Assignee: Hitachi, Ltd., Tokyo, Japan

[21] Appl. No.: 498,485

[22] Filed: Jul. 5, 1995

[30] Foreign Application Priority Data

Jul. 5, 1994 [JP] Japan ................................. 6-153300

[51] Int. Cl.$^6$ ................................. B23K 9/04
[52] U.S. Cl. ................ 219/137 WM; 148/524; 219/76.12; 219/127; 228/165
[58] Field of Search ................ 219/137 WM, 219/137 R, 127, 76.12, 76.14, 76.15, 76.16, 121.35; 228/165, 203; 148/524, 525; 376/260

[56] References Cited

U.S. PATENT DOCUMENTS

| | | | |
|---|---|---|---|
| 4,234,119 | 11/1980 | Masaoka et al. | 219/137 R |
| 4,247,037 | 1/1981 | Tamai et al. | 228/203 |
| 4,562,332 | 12/1985 | Walter et al. | 219/121.35 |
| 5,494,539 | 2/1996 | Tsujimura et al. | 148/524 |
| 5,515,589 | 5/1996 | Kazirskis et al. | 376/260 |
| 5,521,353 | 5/1996 | Mitsui et al. | 219/127 |

OTHER PUBLICATIONS

Journal of Materials Science, 26 (1991), H. Lin et al., "Helium–Induced Weld Cracking in Austenitic and Martensitic Steels", pp. 2063–2070.

Welding Journal, 67, (1988), W. Kanne, Jr., "Remote Reactor Repair: GTA Weld Cracking Caused by Entrapped Helium", pp. 33–39.

*Primary Examiner*—Clifford C. Shaw
*Attorney, Agent, or Firm*—Antonelli, Terry, Stout & Kraus, LLP.

[57] ABSTRACT

Disclosed is a highly reliable weld repairing method to repair a crack defect in structures and apparatus inside pressure vessels of nuclear reactors, while preventing generation of new crack defects in the structures and apparatus during the repairing. These structures and apparatus are made of any of stainless steel and Ni-base alloys, and are irradiated with high energy corpuscular ray during operating period of the reactor. The repairing method includes the steps of eliminating a region of the structure or the apparatus including a portion having the crack defect, and executing spot welding at a surface of the region continuously or interruptedly in a manner so as to form a first welded layer in a manner that each of the spot welded spots is half-overlapped with adjacent welded spots. Additionally, welding for forming at least a second layer, on the first welded layer, so that the at least a second layer is not deeper than a weld penetration thickness of the first welded layer can be performed.

21 Claims, 4 Drawing Sheets

5 SECOND LAYER

4 FIRST LAYER

3

METHOD FOR WELD REPAIRING OF STRUCTURES IN NUCLEAR REACTORS

BACKGROUND OF THE INVENTION

(1) Field of the Invention

The present invention relates to a method for weld repairing of structures and apparatus constituting the inside of a pressure vessel of a nuclear reactor during an operating period of nuclear power plants. Especially, the present invention is effective in a case when a crack defect is generated in the structures and apparatus which have been irradiated with a high energy corpuscular ray, the crack defect must be eliminated for repairing, and the repairing must be performed by spot welding which enables to repair the defect with high reliability and no crack generation after the weld repairing.

(2) Description of the Prior Art

Stainless steel and Ni base alloy materials which have been irradiated with a high energy corpuscular ray contain helium which is generated by nuclear conversion of constituting elements of the materials.

The inventors conceived that when a welding operation is executed to on the above helium containing materials;

- a heat affected zone near a metal molten portion is heated to a high temperature,
- diffusion of the helium to grain boundaries is enhanced by thermal activation,
- the helium gathered at the grain boundaries forms bubbles,
- consequently, strength at the grain boundaries decreases,
- further, a grain boundary crack defect is generated at the heat affected zone when a tensile stress is added by solidification and shrinkage of the metal after the welding, and
- the grain boundary crack defect is not generated in the molten metal at the welding operation or at a location different from the grain boundaries of the non-melted metal because the helium contained in the material before the welding is released outside the material when the material is melted at the welding.

The above behavior of the material containing helium has been disclosed in H. T. Lin and B. A. Chin (Journal of Material Science 26, (1991) p. 2063-2070), and W. R. Kanne, Jr. (Welding Journal 67 (1988) p. 33-39).

The structures and apparatus inside a pressure vessel of a nuclear reactor are in an environment under high energy corpuscular ray irradiation. Therefore, generation of an aged crack defect such as stress corrosion cracking, and propagation of the crack defect by an environment of high temperature and high pressure water during an operating period of the nuclear reactor depending on composition of the material, are deemed as a concern.

Several repairing methods for the above crack defect are disclosed such as;

- a method comprising the steps of eliminating the crack defect using a grinder, preparing a groove, and executing a repairing weld,
- a method comprising the steps of melting the crack defect portion by continuous welding, and finishing the continuous welding bead,
- a method comprising the steps of melting only a surface of the crack defect by continuous welding, and enclosing the crack defect inside the material for preventing propagation of the crack defect, and
- a method wherein a region containing the crack defect is covered with a plate, and fillet welding of corners of the plate with the structure for separating the crack defect from the environment in the nuclear reactor to prevent propagation of the crack.

One of repairing methods by spot welding has been applied for the U.S. patent application Ser. No. 08/297,051, now U.S. Pat. No. 5,494,539, by one of inventors of the present application. The repairing execution method claimed in the above application for repairing a non-penetrating cracking portion generated in structures made of austenitic stainless steel comprises the step of performing spot welding without using welding material for melting the non-penetrating cracking defect portion or melting only a surface of the non-penetrating cracking defect portion, in order to prevent propagation of the non-penetrating cracking defect portion including the defect inside the material.

However, the above described various repairing methods by prior art do not consider sufficiently of influence of irradiation with high energy corpuscular ray during an operating period of the nuclear power plant.

When the above repairing methods are applied to the material irradiated with the high energy corpuscular ray, a new crack defect is generated at the heat affected zone of the welding.

A repairing method in consideration of the above influence of the irradiation of high energy corpuscular ray has been invented by one of the inventors of the present application (Japanese Patent Application No. 5-79254 (1993)), wherein the structure, which is irradiated with high energy corpuscular ray and has a crack defect, is first processed by a surface melting treatment at the crack defect region before executing the repairing welding in order to prevent generating a new crack defect. In the above surface melting treatment, a quantity of heat input is controlled to be in a range of $1 \times 10^1 \sim 1 \times 10^3$ J/mm.

As described previously, the repairing technique by prior the art (applying the U.S. patent application Ser. No. 08/297,051, now U.S. Pat. No. 5,494,539) has a concern of a new crack defect generated by the spot welding, because the influence of irradiation of the high energy corpuscular ray is not considered, and further, the melting is performed without eliminating the crack defect. In the above case, if the crack defect is shallow, the crack defect can be eliminated by the melting. However, if the crack defect is deep, a part of the crack defect remains inside the material even after the melting, and accordingly, the technique can not be used for a repairing operation aiming at complete elimination of the crack defect or for repairing operation of structures wherein loading of a perpendicular stress to the crack defect is anticipated.

Accordingly, the crack defect must be eliminated completely before the welding in order to prevent generating a new crack defect.

The prior art proposed in Japanese Patent Application No. 5-79254 (1993) is a repairing execution technique in consideration of the influence of irradiation with a high energy corpuscular ray, wherein the crack defect is eliminated completely before the surface melting treatment for providing layers which do not generate a new crack defect. However, even if the surface treatment is performed with a relatively small quantity of heat input, the temperature in the heat affected zone increases according to a moving heat source, and a crack defect is generated at a portion exceeding a limit, because the method is different from the present invention wherein the heat source performs successive spot welding.

SUMMARY OF THE INVENTION (1) Objects of the Invention:

In consideration of the above described problems of prior art, an object of the present invention is to provide a method for preventing generation of a new crack defect in repairing structures, which repairing includes surface melting treatment of the structures which are irradiated with a high energy corpuscular ray and have a crack defect.

(2) Methods of Solving the Problems:

A first invention is a weld repairing method for structures and apparatus inside a pressure vessel of nuclear reactors, the structures and the apparatus being made of any of stainless steel and Ni-base alloys, and being irradiated with high energy corpuscular ray equal to or less than $5.0 \times 10^{27}$ n/m$^2$ during an operating period of the reactor and having a crack defect, comprising the steps of:

eliminating a region of the structure or the apparatus including the crack defect portion, and executing spot welding at a surface of the region continuously or interruptedly in a manner so as to form a first welded layer by half-overlapping each of the spot welded spots.

A second invention is a weld repairing method for structures and apparatus inside a pressure vessel of nuclear reactors, the structures and the apparatus being made of any of stainless steel and Ni-base alloys, and being irradiated with high energy corpuscular ray equal to or less than $5.0 \times 10^{27}$ n/m$^2$ during operating period of the reactor and having a crack defect, comprising the steps of:

eliminating a region of the structure or the apparatus including the crack defect portion, executing spot welding at a surface of the region continuously or interruptedly in a manner so as to form a first welded layer by half-overlapping each of the spot welding spots, and executing spot welding with welding material at a surface of the first layer continuously or interruptedly in a manner so as to form a second welded layer or more welded layers with less heat input than the heat input for the first welded layer so as to make a temperature of the base material adjacently under the first welded layer to be a temperature at which any welding defect is not generated by the spot welding for the second or later welded layer.

A third invention is a weld repairing method for structures and apparatus inside a pressure vessel of nuclear reactors as described in any of the above first and second inventions, wherein a melted portion by the spot welding execution is cooled down rapidly by blowing cooling gas to the melted portion from a welding torch or vicinity of the welding torch simultaneously with extinguishing the welding arc.

A fourth invention is a weld repairing method for structures and apparatus inside a pressure vessel of nuclear reactors as described in any of the above first, second, and third inventions, wherein means for executing the spot welding to the structures and the apparatus are any heat source selected from a group of TIG arc, plasma arc, and laser, and the spot welding is executed by supplying heat energy pulsewise or supplying electric current periodically and interruptedly.

DESCRIPTION OF PREFERRED EMBODIMENTS

A space inside a pressure vessel of a nuclear reactor is an environment under high energy corpuscular ray irradiation. Therefore, structures and apparatus, inside the pressure vessel, made of stainless steel and/or Ni base alloy materials contain helium in their material because the helium is generated by nuclear conversion of constituting elements of the material when the stainless steel and Ni base alloy materials are irradiated with a high energy corpuscular beam.

The inventors conceived that when welding operation is executed to the above helium containing materials;

a heat affected zone near a metal molten portion is heated to a high temperature, diffusion of the helium to grain boundaries is enhanced by thermal activation, the helium gathered at the grain boundaries form bubbles, consequently, strength at the grain boundaries decreases, further, a grain boundary crack defect is generated at the heat affected zone when a tensile stress is added to the grain boundaries by solidification and shrinkage of the metal after the welding, and the grain boundary crack defect is not generated in the molten metal at the welding operation or at a location different from the grain boundaries of the non-melted metal because the helium contained in the material before the welding is released outside the material when the material is melted at the welding.

Further, the inventors found that if a period when the material is retained at a high temperature is shortened by executing interrupted welding according to a spot welding technique, and is not subjected to a continuous welding technique, utilizing any heat source selected from a group of TIG arc, plasma arc, and laser, the diffusion of helium is suppressed and generation of the crack defect can be prevented.

Accordingly, the present invention is aimed at providing a method for repairing defective material utilizing the above finding that the diffusion of helium is suppressed and generation of the crack defect can be prevented, if a retaining period of the material at a high temperature is shortened by executing interrupted welding according to a spot welding technique, and is not subjected to a continuous welding technique, utilizing any heat source selected from a group of TIG arc, plasma arc, and laser.

An embodiment of the present invention utilizing the above method is explained hereinafter.

Figure 6:
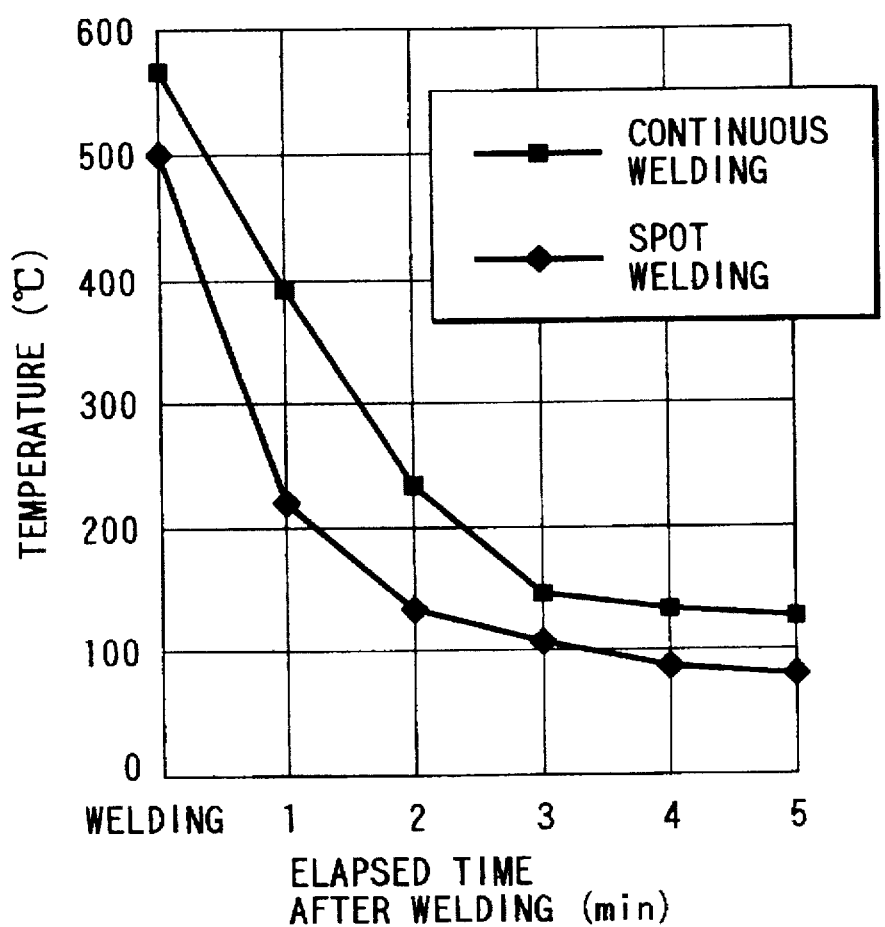
FIG. 6 is a graph indicating cooling speed of the material at the spot welding and the continuous welding.

FIG. 6 is a graph indicating cooling speed of the material at the spot welding and the continuous welding. The cooling speed of the material at the continuous welding is slow because the melted portion is supplied with heat from a moving heat source which moves continuously. On the contrary, the cooling speed of the material at the spot welding is faster than that of the material during continuous welding because the melted portion does not receive any additional heat from a heat source which does not move. Further, the cooling speed of the material can be accelerated by blowing cooling gas from the spot welding torch or the vicinity of the torch.

Accordingly, the retaining period at a high temperature of the heat affected zone of the base material adjacently under the melted metal is shortened, and the diffusion of helium can be suppressed.

Furthermore, the inventors found that the spot welding executed portion becomes a layer where the crack defect is not generated because the helium is released outside the material, and accordingly, the crack defect is not generated even if welding with a large quantity of heat input is executed at a surface of the spot welding executed portion as far as a melting portion and heat affected zone of the welding with the large quantity of heat input are within the above layer.

Figure 1:
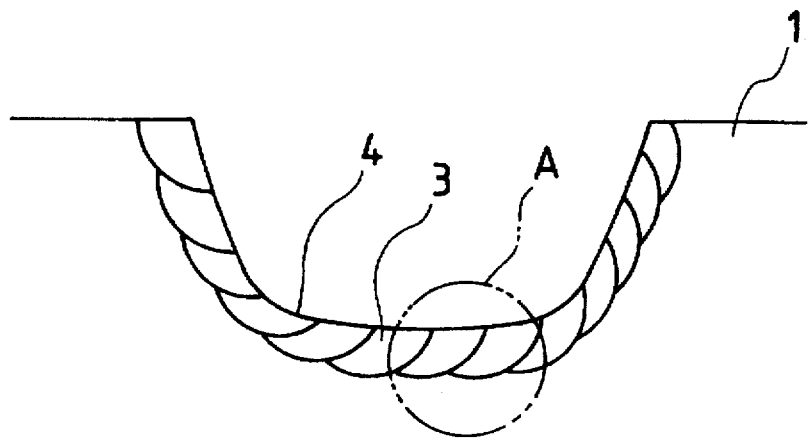
FIG. 1 is a schematic cross section of the material in the embodiment of the present invention, wherein the crack defect had been eliminated, and the first welded layer was formed by spot welding.

FIG. 1 indicates first layer welded portion 4 by executing spot welding. The spot welding portion 3 is half-overlapped so as to form the first layer welded portion 4 of thickness L. On account of executing spot welding, a crack defect is not generated in the heat affected zone 7 of the base material.

Figure 3:
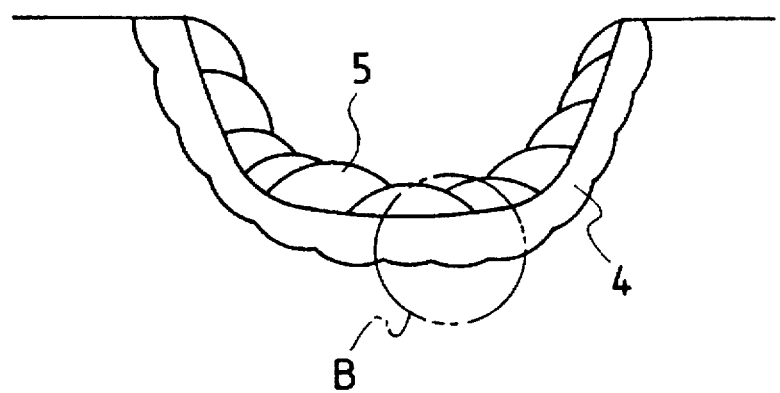
FIG. 3 is a schematic cross section of the material in the embodiment of the present invention, wherein the crack defect had been eliminated, and the second welded layer was formed on the first welded layer by spot welding.
Figure 4:
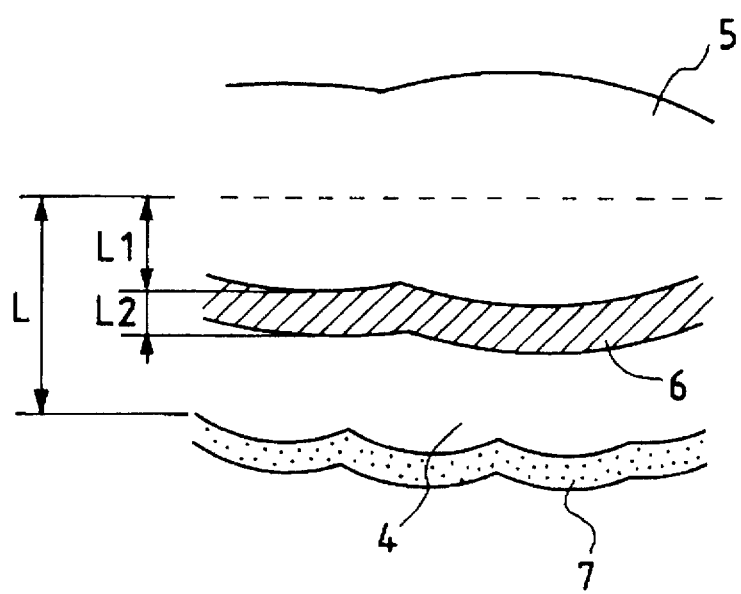
FIG. 4 is a partial enlarged detail of the B portion in FIG. 3.

FIG. 3 indicates the second layer welded portion 5. The second layer welded portion 5 is welded with welding material, and a crack defect is not generated by the second layer welding as far as a sum of depth of weld penetration L1 of the second layer welded portion 5 and thickness L2 of the heat affected zone 6 does not exceed the thickness L of the first layer welded portion 4.

In accordance with decreasing heat input for welding the second layer 5, diffusion of helium in the base material 7 adjacently under the first layer welded portion 4 is not facilitated at the welding the second layer. And, the crack defect is not generated because temperature is not increased to the temperature T to Generate the crack defect.

In repairing of the crack defect, which is the object of the present invention, generation of the crack defect in the second layer and after the second layer can be prevented by forming the first layer welded portion, where the crack defect is not generated, by spot welding after eliminating the crack defect.

In the present embodiment, an example of the execution with the plate material which has been irradiated with high energy corpuscular ray of $0-5.0 \times 10^{27}$ n/m$^2$ is explained.

Figure 5:
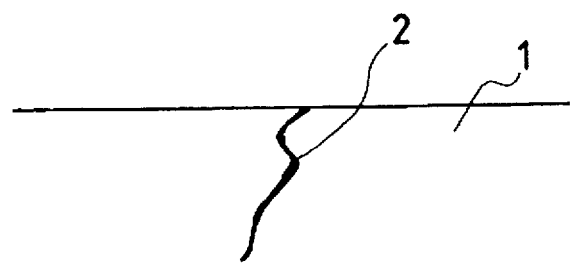
FIG. 5 is a schematic cross section of the material, wherein a crack defect has been generated.

FIG. 5 indicates a condition wherein the crack defect 2 exists in the plate material 1. After eliminating the crack defect 2 in the plate material 1, spot welding 3 is executed by TIG welding without using welding material. The spot welding is performed so as to half-overlap the just previous welded spot 1 on all over the defect eliminated portion for forming the first layer welded portion 4. The condition wherein the first layer welded portion is formed is shown in FIG. 1. The spot welding was executed in a condition that welding current is 10–100 A, welding voltage is 8–12 V, and welding time is 0.1–5 seconds.

Figure 2:
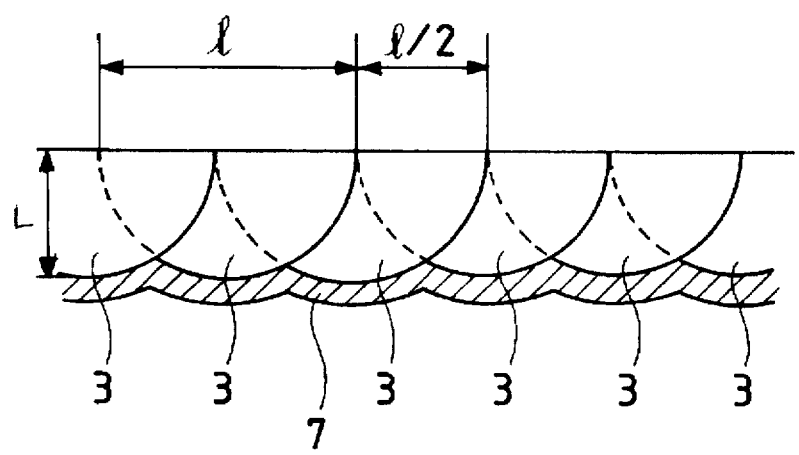
FIG. 2 is a partial enlarged detail of the A portion in FIG. 1.
Figure 8:
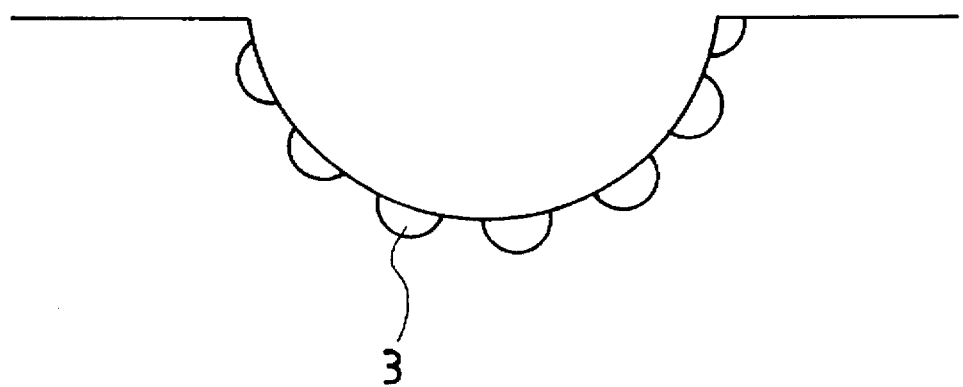
FIG. 8 is a schematic cross section of the material in the embodiment of the present invention, wherein crack defect of the material had been eliminated, and the spot welding was executed interruptedly.

FIG. 1 indicates a case when the spot welding is executed continuously. However, an executing method, wherein the spot welding is performed interruptedly as shown in FIG. 8 and the first layer welded portion 4 is formed by performing the spot welding so that the welded spot is half-overlapped with the just previous welded spot as shown in FIG. 2, is effective because concentration of the heat input can be weakened. FIG. 3 indicates a condition when the second layer welded portion 5 is formed on the first layer welded portion 4. The second layer welded portion 5 is formed by TIG welding, which can be executed with shallow melting. Therefore, a sum of depth of weld penetration L1 of the second layer welded portion 5 into the first layer welded portion 4 and thickness L2 of the heat affected zone 6 is within a range which does not exceed the thickness L of the first layer welded portion 4.

The heat input at the second layer welding is restricted so as to make the temperature T of the base material 7 adjacently under the first layer welded portion 4 equal to or below 900° C. at the execution of the second layer welding.

Figure 7:
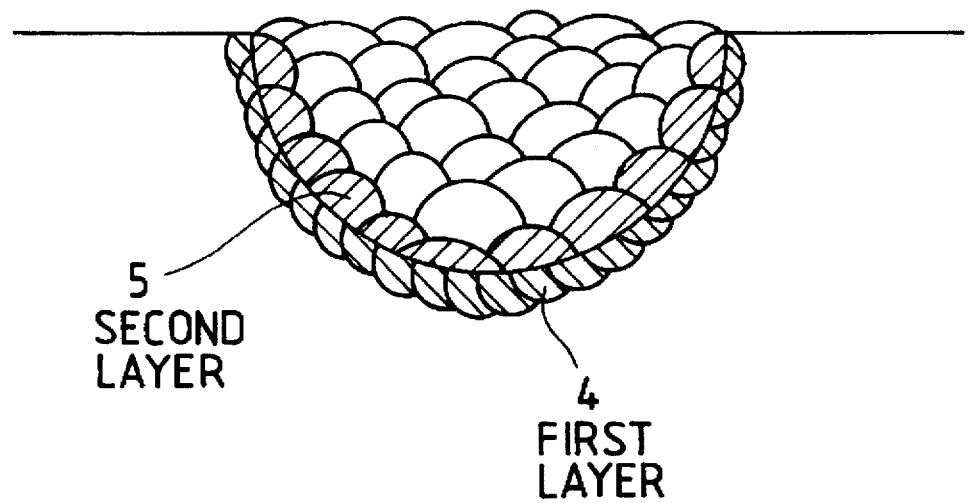
FIG. 7 is a schematic cross section of the material in the embodiment of the present invention, wherein the weld repairing is finished.

In accordance with the above execution, an initially existing crack defect can be eliminated as shown in FIG. 7. Further, a new crack defect is not generated at the welded repaired base material 7, and accordingly, integrity of the structure can be maintained.

When executing the spot welding, thermal energy is supplied pulsewise to the material to be repaired from a thermal energy source selected from any of TIG arc welder, plasma arc welder, and laser welder, or electric current is supplied periodically and interruptedly to the material to be repaired for performing the welding.

As explained above, a preferably reliable weld repairing method can be obtained for structures and apparatus inside a pressure vessel of nuclear reactors, the structures and the apparatus being made of any of stainless steel and Ni-base alloys and having a crack defect which is generated by being irradiated with high energy corpuscular ray during an operating period of the reactor, by eliminating the crack defect, and by subsequently preventing generation of a new crack defect by performing repairing welding including execution of spot welding.

What is claimed is:

1. A weld repairing method for structures and apparatus inside pressure vessels of nuclear reactors, the structures and the apparatus being made of a material selected from the group consisting of stainless steel and Ni-base alloys, and having a crack defect in a crack defect portion thereof, comprising the steps of:

eliminating a region of the structures or the apparatus including the crack defect portion, and executing spot welding at a surface exposed after elimination of the region, the spot welding being executed in a manner so as to form a first welded layer having spot welded spots, the spot welded spots being formed such that each of the spot welded spots is half-overlapped with adjacent welded spots.

2. A weld repairing method as claimed in claim 1, wherein a melted portion in executing the spot welding is cooled down by blowing cooling gas to the melted portion from a welding torch or a vicinity of the welding torch simultaneously with extinguishing a welding arc.

3. A weld repairing method as claimed in claim 1, wherein the spot welding to the structures and the apparatus is performed by a heat source selected from the group consisting of a TIG arc, a plasma arc, and a laser, and the spot welding is executed by supplying heat energy.

4. A weld repairing method as claimed in claim 3, wherein the heat energy is supplied pulsewise.

5. A weld repairing method as claimed in claim 3, wherein the heat energy is supplied periodically and interruptedly.

6. A weld repairing method as claimed in claim 1, wherein the structures and apparatus are structures and apparatus that have been irradiated with high energy corpuscular rays of at most $5.0 \times 10^{27}$ n/m² during an operating period of the nuclear reactors.

7. Product formed by the method claim 1.

8. A weld repairing method for structures and apparatus inside pressure vessels of nuclear reactors, the structures and apparatus being made of a material selected from the group consisting of stainless steel and Ni-base alloys, and having a crack defect in a crack defect portion thereof, comprising the steps of:

eliminating a region of the structures or the apparatus including the crack defect portion, executing a first spot welding at a surface exposed after elimination of the region, the first spot welding being executed in a manner so as to form a first welded layer having spot welded spots, the spot welded spots being formed such that each of the spot welded spots is half-overlapped with adjacent welded spots, and executing spot welding with welding material at a surface of the first layer in a manner so as to form at least a second welded layer, said executing spot welding to form at least a second welded layer being performed with less heat input than a heat input for forming the first welded layer, so as to make a temperature of base material adjacently under the first welded layer formed by the first spot welding to be a temperature at which any welding defect is not generated by the spot welding for the at least a second welded layer.

9. A weld repairing method as claimed in claim 8, wherein a melted portion in executing the first spot welding is cooled down by blowing cooling gas to the melted portion from a welding torch or a vicinity of the welding torch simultaneously with extinguishing a welding arc.

10. A weld repairing method as claimed in claim 9, wherein the first spot welding is performed by a heat source selected from the group consisting of a TIG arc, a plasma arc, and a laser, and the first spot welding is executed by supplying heat energy.

11. A weld repairing method as claimed in claim 10, wherein the heat energy is supplied pulsewise.

12. A weld repairing method as claimed in claim 10, wherein the heat energy is supplied periodically and interruptedly.

13. A weld repairing method as claimed in claim 8, wherein the first spot welding is performed by a heat source selected from the group consisting of a TIG arc, a plasma arc, and a laser, and the first spot welding is executed by supplying heat energy.

14. A weld repairing method as claimed in claim 13, wherein the heat energy is supplied pulsewise.

15. A weld repairing method as claimed in claim 13, wherein the heat energy is supplied periodically and interruptedly.

16. A weld repairing method as claimed in claim 8, wherein the structures and apparatus are structures and apparatus that have been irradiated with high energy corpuscular rays of at most $5.0 \times 10^{27}$ n/m² during an operating period of the nuclear reactors.

17. Product formed by the method of claim 8.

18. Structure for use inside of a pressure vessel of a nuclear reactor, said structure being made of a material selected from the group consisting of stainless steel and Ni-base alloys, the structure having a groove portion at a region of the structure where a crack defect in the structure had been, the groove portion eliminating the crack defect, a surface of the groove portion including a first welded layer having overlapping spot welded spots, in such a manner that each of the spot welded spots is half-overlapped with adjacent welded spots.

19. The structure as claimed in claim 18, wherein the structure is a structure that has been irradiated with a high energy corpuscular ray of at most $5.0 \times 10^{27}$ n/m² during operation of the nuclear reactor.

20. The structure as claimed in claim 18, further comprising at least a second welded layer on the first welded layer, said at least a second welded layer being at least one layer formed by spot welding with welding material at a surface of the first welded layer.

21. The structure as claimed in claim 20, wherein the structure is a structure that has been irradiated with a high energy corpuscular ray of at most $5.0 \times 10^{27}$ n/m² during operation of the nuclear reactor.

* * * * *